US012759511B2

(12) United States Patent
Koeper et al.

(10) Patent No.: US 12,759,511 B2
(45) Date of Patent: Oct. 13, 2026

(54) SYSTEMS AND METHODS FOR CLEANING SENSORS OF VEHICLE

(71) Applicant: Torc Robotics, Inc., Blacksburg, VA (US)

(72) Inventors: Maximilian Koeper, Blacksburg, VA (US); Marat Kopytjuk, Blacksburg, VA (US); Maximilian Yassine Beyen, Blacksburg, VA (US); Margarita Kunjavskaja, Blacksburg, VA (US); Simon Bäuerle, Blacksburg, VA (US)

(73) Assignee: TORC Robotics, Inc., Blacksburg, VA (US)

( * ) Notice: Subject to any disclaimer, the term of this patent is extended or adjusted under 35 U.S.C. 154(b) by 94 days.

(21) Appl. No.: 18/629,741

(22) Filed: Apr. 8, 2024

(65) Prior Publication Data

US 2025/0313175 A1 Oct. 9, 2025

(51) Int. Cl.
*B60S 3/04* (2006.01)
*B08B 3/02* (2006.01)

(52) U.S. Cl.
CPC .................. *B60S 3/04* (2013.01); *B08B 3/02* (2013.01); *B08B 2203/02* (2013.01)

(58) Field of Classification Search
None
See application file for complete search history.

(56) References Cited

U.S. PATENT DOCUMENTS

| | | | |
|---|---|---|---|
| 6,425,407 B2 | 7/2002 | Jones |
| 6,554,210 B2 | 4/2003 | Holt |
| 10,723,325 B2 | 7/2020 | Rice |
| 2023/0356698 A1 | 11/2023 | Shi |

*Primary Examiner* — Eric W Golightly
(74) *Attorney, Agent, or Firm* — Armstrong Teasdale LLP

(57) ABSTRACT

A system for cleaning a vehicle sensor includes a cleaning device movable relative to a vehicle, an actuator configured to position the cleaning device relative to the vehicle, and a sensor configured to collect information relating to a position of a vehicle sensor on the vehicle. The system also includes a controller communicatively coupled to the sensor and the actuator. The controller is configured to receive information from the sensor and identify the vehicle sensor on the vehicle. The controller is configured to operate the actuator to selectively position the cleaning device relative to the vehicle and target the vehicle sensor on the vehicle.

16 Claims, 6 Drawing Sheets

SYSTEMS AND METHODS FOR CLEANING SENSORS OF VEHICLE

TECHNICAL FIELD

The field of the disclosure relates generally to cleaning systems and, more specifically, to systems for cleaning sensors of vehicles.

BACKGROUND OF THE INVENTION

Vehicles such as trucks may be used to move trailers between locations, such as launching/receiving stations or hubs. Autonomous vehicles, semi-autonomous vehicles, non-autonomous vehicles, and smart vehicles may include sensors that provide information during operation of the vehicles. For example, an autonomous and semi-autonomous vehicle may use information from the sensors to operate itself to perform various operations such as controlling or regulating acceleration, braking, or steering wheel positioning. Non-autonomous and/or smart vehicles may provide information from the sensors to a user to facilitate the user operating the vehicle or diagnosing an operating status of the vehicle.

For example, the sensors may include radio detection and ranging (RADAR) sensors, light detection and ranging (LiDAR) sensors, cameras, acoustic sensors, temperature sensors, or inertial navigation system (INS), and be configured to collect information regarding the environment while the vehicle is traveling. However, the sensors may become polluted or obstructed. As a result, the sensors' ability to collect information may be impaired and operation of the vehicle may be restricted. For example, autonomous or semi-autonomous vehicles require sensors to provide high quality information for safe operation of the vehicle. Further, current systems for cleaning vehicles may not target sensors, may not fully clean the sensors, and/or may require expensive mechanisms that are located onboard the vehicle. In addition, the cleaning capabilities of at least some known systems may be limited by a size of a reservoir that supplies cleaning fluid for the systems. For example, the size of the reservoir may be limited to accommodate onboard vehicle requirements (e.g., weight and size restrictions for vehicles that travel on roads).

Therefore, there is a need for improved cleaning systems for vehicles that effectively cleans sensors and is not limited by onboard vehicle requirements.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a system for cleaning a vehicle sensor includes a cleaning device movable relative to a vehicle, an actuator configured to position the cleaning device relative to the vehicle, and a sensor configured to collect information relating to a position of a vehicle sensor on the vehicle. The system also includes a controller communicatively coupled to the sensor and the actuator. The controller is configured to receive information from the sensor and identify the vehicle sensor on the vehicle. The controller is configured to operate the actuator to selectively position the cleaning device relative to the vehicle and target the vehicle sensor on the vehicle.

In another aspect, a system for cleaning target locations on a vehicle includes an onboard interface configured to be incorporated into a vehicle, a cleaning device movable relative to the vehicle and configured to clean portions of the vehicle, and an actuator configured to position the cleaning device relative to the vehicle. The system also includes a controller including a communication system that is configured to communicate with the onboard interface and receive information relating to target locations on the vehicle from the onboard interface. The controller is configured to operate the actuator to selectively position the cleaning device relative to the vehicle and clean the target locations on the vehicle.

In yet another aspect, a method for cleaning a vehicle sensor includes collecting, using a sensor, information relating to a position of a vehicle sensor on a vehicle; determining, using a controller communicatively coupled to the sensor, a location of the vehicle sensor on the vehicle based on information received from the sensor; and determining, using the controller, instructions that cause an actuator to selectively position a cleaning device on a support, relative to the vehicle and target the vehicle sensor on the vehicle. The method also includes cleaning, using the cleaning device, the vehicle sensor.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

Figure 1:
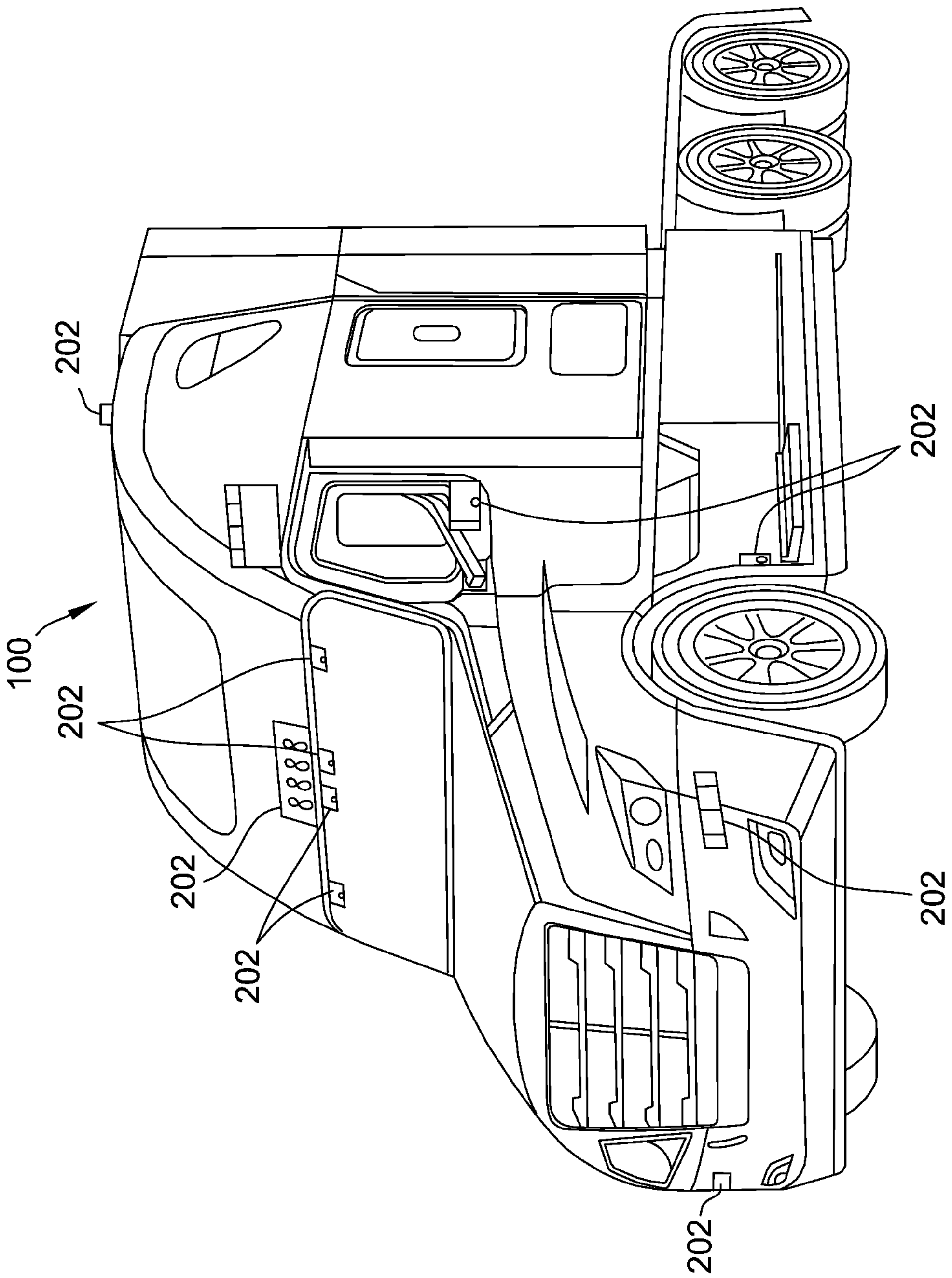
FIG. 1 is a schematic diagram of a vehicle.

Corresponding reference characters indicate corresponding parts throughout the several views of the drawings. Although specific features of various examples may be shown in some drawings and not in others, this is for convenience only. Any feature of any drawing may be referenced or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

An autonomous vehicle: An autonomous vehicle is a vehicle that is able to operate itself to perform various operations such as controlling or regulating acceleration, braking, or steering wheel positioning, without any human intervention. An autonomous vehicle has an autonomy level of level-4 or level-5 recognized by National Highway Traffic Safety Administration (NHTSA).

A semi-autonomous vehicle: A semi-autonomous vehicle is a vehicle that is able to perform some of the driving related operations such as keeping the vehicle in lane or parking the vehicle without human intervention. A semi-autonomous vehicle has an autonomy level of level-1, level-2, or level-3 recognized by NHTSA.

A non-autonomous vehicle: A non-autonomous vehicle is a vehicle that is driven by a human driver. A non-autonomous vehicle is neither an autonomous vehicle nor a semi-autonomous vehicle. A non-autonomous vehicle has an autonomy level of level-0 recognized by NHTSA.

A smart vehicle: A smart vehicle is a vehicle installed with on-board computing devices, one or more sensors, one or more controllers, or one or more internet-of-things (IoT) devices which enables the vehicle to receive or transmit data to another vehicle or a server.

Embodiments of the present application include systems and methods for cleaning at least one vehicle sensor of a vehicle. For example, during operation, the vehicle sensor may collect information relating to an environment of the vehicle and the sensor may become polluted. The systems and methods described herein provide autonomous or semi-autonomous cleaning of the sensor to facilitate the sensor providing high quality information.

For example, embodiments of the present application include a cleaning device movable relative to the vehicle, an actuator configured to position the cleaning device relative to the autonomous vehicle, a sensor, and a controller communicatively coupled to the sensor and the actuator. The controller is configured to receive information from the sensor and identify the vehicle sensors or target locations on the vehicle. In some embodiments, the controller includes a communication system that is configured to communicate with an onboard interface and receive information relating to target locations on the vehicle from the onboard interface. The controller is configured to operate the actuator to selectively position the cleaning device relative to the vehicle and target the vehicle sensors on the vehicle or target locations on the vehicle. As a result, the vehicle sensors and/or target locations on the vehicle are cleaned quickly and thoroughly to ensure proper operation. The vehicle sensors may be cleaned while the vehicle is at a hub for loading, unloading, and/or maintenance. Also, the system may be used to clean different vehicles and may be cheaper to operate than other cleaning systems. Moreover, the system does not have size or other restrictions that may limit the ability of an onboard system to effectively clean a vehicle sensor.

Figure 2:
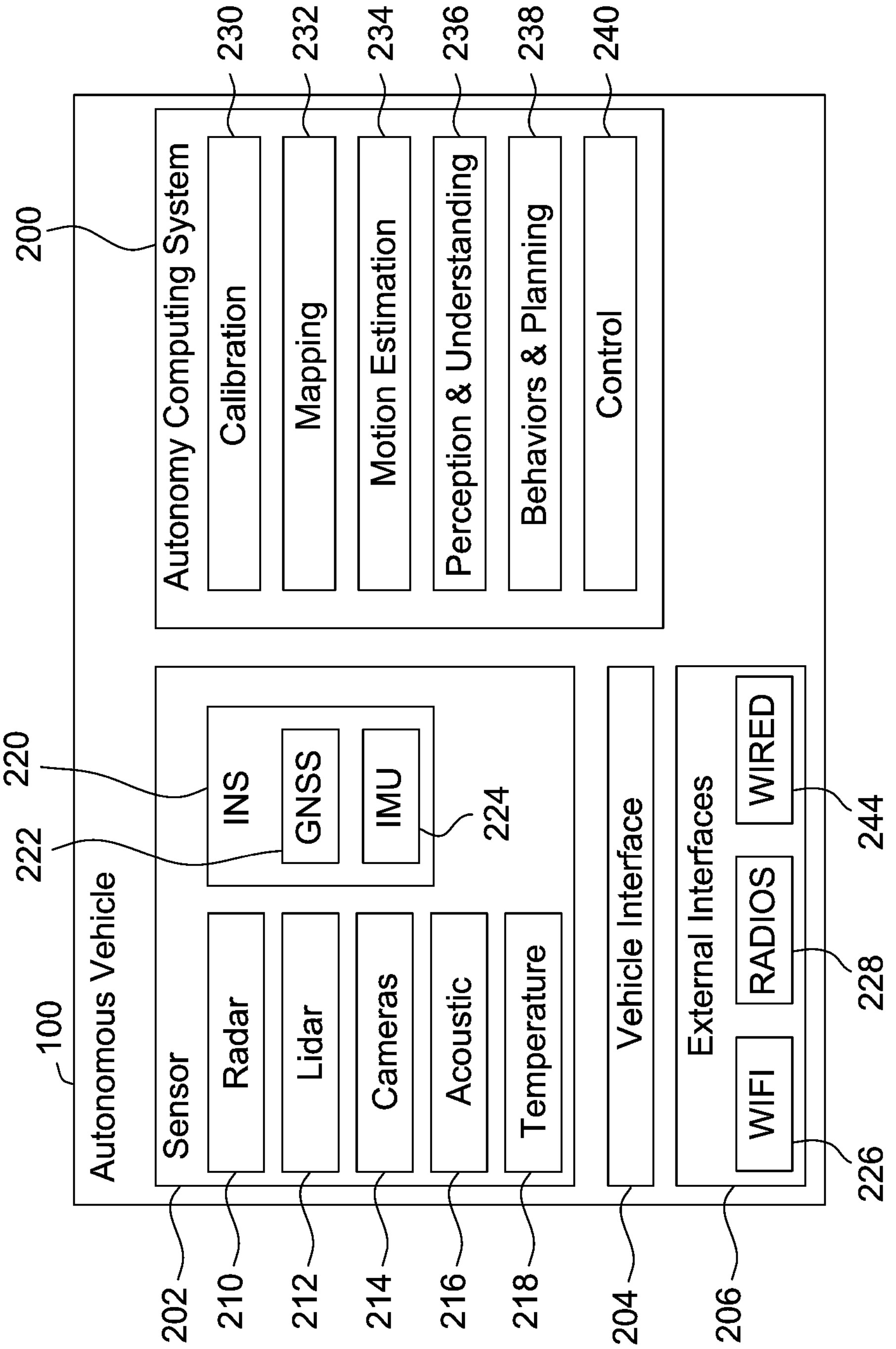
FIG. 2 is a block diagram of the vehicle of FIG. 1.

FIG. 1 is a schematic diagram of a vehicle 100. FIG. 2 is a block diagram of vehicle 100 shown in FIG. 1. For example, vehicle 100 may be an autonomous vehicle, a semi-autonomous vehicle, a non-autonomous vehicle, or a smart vehicle. In the example embodiment, vehicle 100 is an autonomous vehicle and includes autonomy computing system 200, sensors 202, a vehicle interface 204, and external interfaces 206. As described in further detail below, system 300 is configured to clean sensors 202 and/or target locations on vehicle 100.

In the example embodiment, sensors 202 may include various sensors such as, for example, radio detection and ranging (RADAR) sensors 210, light detection and ranging (LiDAR) sensors 212, cameras 214, acoustic sensors 216, temperature sensors 218, or inertial navigation system (INS) 220, which may include one or more global navigation satellite system (GNSS) receivers 222 and one or more inertial measurement units (IMU) 224. Other sensors 202 not shown in FIG. 2 may include, for example, acoustic (e.g., ultrasound), internal vehicle sensors, meteorological sensors, or other types of sensors. Sensors 202 generate respective output signals based on detected physical conditions of vehicle 100 and its proximity. As described in further detail below, these signals may be used by autonomy computing system 200 to determine how to control operation of vehicle 100.

Cameras 214 are configured to capture images of the environment surrounding vehicle 100 in any aspect or field of view (FOV). The FOV can have any angle or aspect such that images of the areas ahead of, to the side, behind, above, or below vehicle 100 may be captured. In some embodiments, the FOV may be limited to particular areas around vehicle 100 (e.g., forward of vehicle 100, to the sides of vehicle 100, etc.) or may surround 360 degrees of vehicle 100. In some embodiments, vehicle 100 includes multiple cameras 214, and the images from each of the multiple cameras 214 may be stitched or combined to generate a visual representation of the multiple cameras' FOVs, which may be used to, for example, generate a bird's eye view of the environment surrounding vehicle 100. In some embodiments, the image data generated by cameras 214 may be sent to autonomy computing system 200 or other aspects of vehicle 100, and this image data may include vehicle 100 or a generated representation of vehicle 100. In some embodiments, one or more systems or components of autonomy computing system 200 may overlay labels to the features depicted in the image data, such as on a raster layer or other semantic layer of a high-definition (HD) map.

LiDAR sensors 212 generally include a laser generator and a detector that send and receive a LiDAR signal such that LiDAR point clouds (or "LiDAR images") of the areas ahead of, to the side, behind, above, or below vehicle 100 can be captured and represented in the LiDAR point clouds. Radar sensors 210 may include short-range RADAR (SRR), mid-range RADAR (MRR), long-range RADAR (LRR), or ground-penetrating RADAR (GPR). One or more sensors may emit radio waves, and a processor may process received reflected data (e.g., raw radar sensor data) from the emitted radio waves. In some embodiments, the system inputs from cameras 214, radar sensors 210, or LiDAR sensors 212 may be fused or used in combination to determine conditions (e.g., locations of other objects) around vehicle 100.

GNSS receiver 222 is positioned on vehicle 100 and may be configured to determine a location of vehicle 100, which it may embody as GNSS data, as described herein. GNSS receiver 222 may be configured to receive one or more signals from a global navigation satellite system (e.g., Global Positioning System (GPS) constellation) to localize vehicle 100 via geolocation. In some embodiments, GNSS receiver 222 may provide an input to or be configured to interact with, update, or otherwise utilize one or more digital maps, such as an HD map (e.g., in a raster layer or other semantic map). In some embodiments, GNSS receiver 222 may provide direct velocity measurement via inspection of the Doppler effect on the signal carrier wave. Multiple GNSS receivers 222 may also provide direct measurements of the orientation of vehicle 100. For example, with two GNSS receivers 222, two attitude angles (e.g., roll and yaw) may be measured or determined. In some embodiments, vehicle 100 is configured to receive updates from an external network (e.g., a cellular network). The updates may include one or more of position data (e.g., serving as an alternative or supplement to GNSS data), speed/direction data, orientation or attitude data, traffic data, weather data, or other types of data about vehicle 100 and its environment.

IMU 224 is a micro-electrical-mechanical (MEMS) device that measures and reports one or more features regarding the motion of vehicle 100, although other implementations are contemplated, such as mechanical, fiber-optic gyro (FOG), or FOG-on-chip (SiFOG) devices. IMU 224 may measure an acceleration, angular rate, and or an orientation of vehicle 100 or one or more of its individual components using a combination of accelerometers, gyroscopes, or magnetometers. IMU 224 may detect linear acceleration using one or more accelerometers and rotational rate using one or more gyroscopes and attitude information from one or more magnetometers. In some embodiments, IMU 224 may be communicatively coupled to one or more other systems, for example, GNSS receiver 222 and may provide input to and receive output from GNSS receiver 222 such that autonomy computing system 200 is able to determine the motive characteristics (acceleration, speed/direction, orientation/attitude, etc.) of vehicle 100.

Vehicle sensors 202 are located in different areas on vehicle 100 and are at least partially exposed to the environment. For example, vehicle sensors 202 are located on and/or coupled to sides, mirrors, doors, a roof, a hood, a windshield, wheels, a rear, a front, and/or any other portions of vehicle 100. At least a portion of each vehicle sensor 202 is exposed to or has visibility to an exterior of vehicle 100 such that vehicle sensors 202 are arranged to detect a characteristic of the environment around vehicle. During operation, vehicle sensors 202 may become polluted by the environment. For example, the exposed portions of vehicle sensors 202 may be obstructed by debris. Accordingly, vehicle sensors 202 may require frequent cleaning to ensure proper operation. However, it may be difficult to access and clean all of vehicle sensors 202 using conventional cleaning systems because vehicle sensors 202 are located on different portions of vehicle 100 and conventional cleaning systems may have location and size restrictions. As described herein, vehicle sensors 202 are efficiently and effectively cleaned using a cleaning system 300 (shown in FIG. 3) that targets and cleans vehicle sensors 202 on vehicle 100. Accordingly, vehicle sensors 202 can be free of pollution and function properly during operation of vehicle 100.

In the example embodiment, autonomy computing system 200 employs vehicle interface 204 to send commands to the various aspects of vehicle 100 that actually control the motion of vehicle 100 (e.g., engine, throttle, steering wheel, brakes, etc.) and to receive input data from one or more sensors 202 (e.g., internal sensors). External interfaces 206 are configured to enable vehicle 100 to communicate with an external network via, for example, a wired, such as wired connection 244, or wireless connection, such as Wi-Fi 226 or other radios 228. In embodiments including a wireless connection, the connection may be a wireless communication signal (e.g., Wi-Fi, cellular, LTE, 5g, Bluetooth, etc.).

In some embodiments, external interfaces 206 may be configured to communicate with an external network via a wired connection 244, such as, for example, during testing of vehicle 100 or when downloading mission data after completion of a trip. The connection(s) may be used to download and install various lines of code in the form of digital files (e.g., HD maps), executable programs (e.g., navigation programs), and other computer-readable code that may be used by vehicle 100 to navigate or otherwise operate, either autonomously or semi-autonomously. The digital files, executable programs, and other computer readable code may be stored locally or remotely and may be routinely updated (e.g., automatically or manually) via external interfaces 206 or updated on demand. In some embodiments, vehicle 100 may deploy with all of the data it needs to complete a mission (e.g., perception, localization, and mission planning) and may not utilize a wireless connection or other connection while underway.

In the example embodiment, autonomy computing system 200 is implemented by one or more processors and memory devices of vehicle 100. Autonomy computing system 200 includes modules, which may be hardware components (e.g., processors or other circuits) or software components (e.g., computer applications or processes executable by autonomy computing system 200), configured to generate outputs, such as control signals, based on inputs received from, for example, sensors 202. These modules may include, for example, a calibration module 230, a mapping module 232, a motion estimation module 234, a perception and understanding module 236, a behaviors and planning module 238, and a control module or controller 240. These modules may be implemented in dedicated hardware such as, for example, an application specific integrated circuit (ASIC), field programmable gate array (FPGA), or microprocessor, or implemented as executable software modules, or firmware, written to memory and executed on one or more processors onboard vehicle 100.

Autonomy computing system 200 of vehicle 100 may be completely autonomous (fully autonomous) or semi-autonomous. In one example, autonomy computing system 200 can operate under Level 5 autonomy (e.g., full driving automation), Level 4 autonomy (e.g., high driving automation), or Level 3 autonomy (e.g., conditional driving automation). As used herein the term "autonomous" includes both fully autonomous and semi-autonomous.

Figure 3:
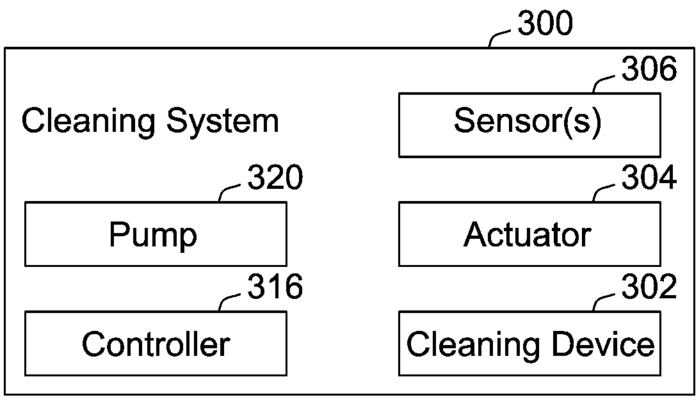
FIG. 3 is a block diagram of a system for cleaning vehicle sensors on the vehicle shown in FIGS. 1 and 2.
Figure 4:
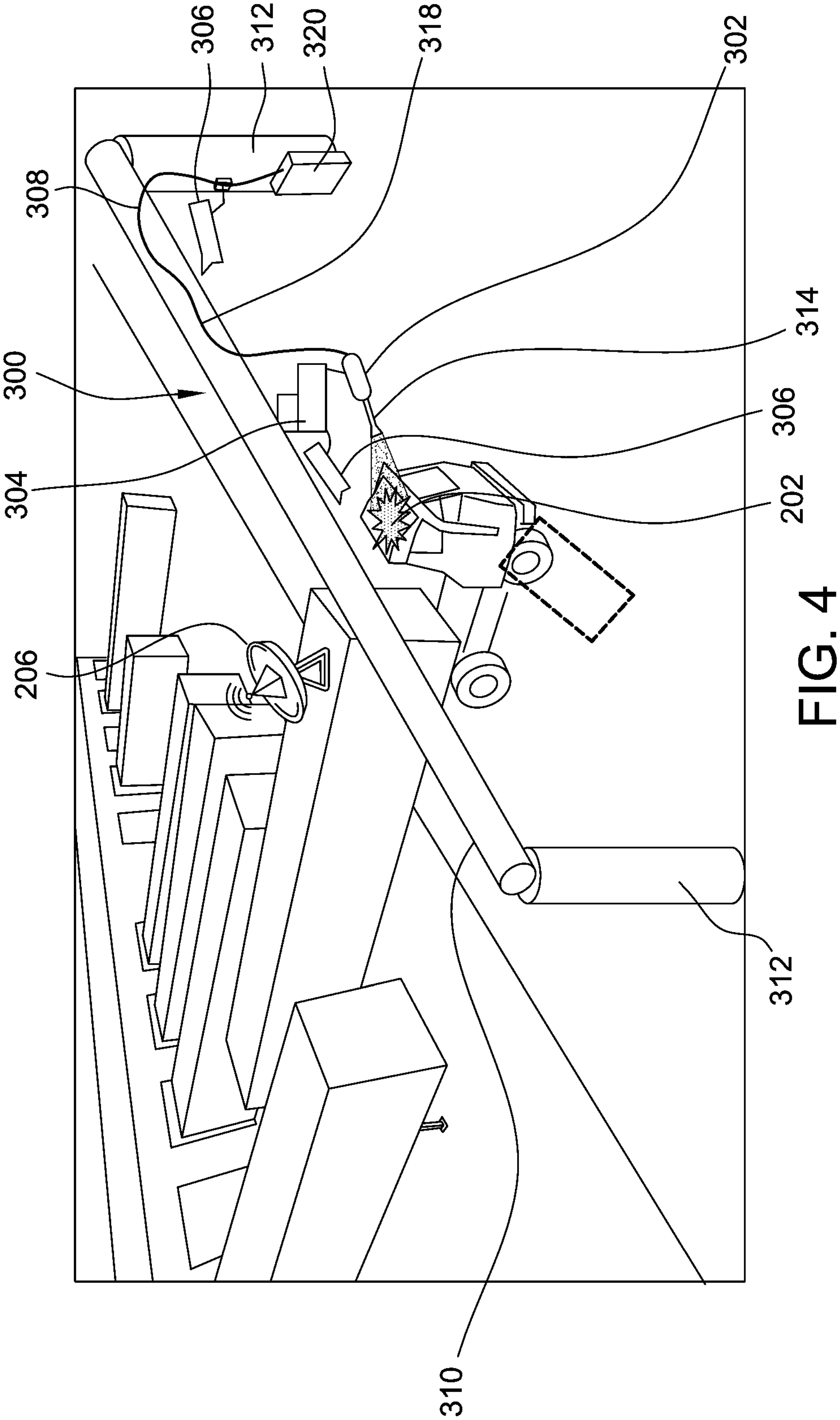
FIG. 4 is a schematic diagram of the vehicle shown in FIGS. 1 and 2 and the system shown in FIG. 3 for cleaning the vehicle sensors on the vehicle.

FIG. 3 is a block diagram of a system 300 for cleaning sensors 202 on vehicle 100 shown in FIG. 1. FIG. 4 is a schematic diagram of vehicle 100 and system 300 for cleaning vehicle sensors (e.g., sensors 202) or other portions of vehicle 100. For example, system 300 is located at a transportation hub, and is arranged to clean vehicle sensors 202 when vehicle 100 is parked at the transportation hub for loading or unloading. In the example, the components of system 300 are located entirely offboard of vehicle 100, i.e., the components are not connected to or carried by vehicle 100. Accordingly, system 300 is not subject to restrictions for size and weight that may apply to cleaning systems onboard vehicle 100. In addition, system 300 is arranged to accommodate and clean a plurality of vehicles and is not associated with only a single vehicle.

System 300 includes a cleaning device 302 movable relative to vehicle 100, an actuator 304 configured to position cleaning device 302 relative to vehicle 100, and a sensor 306 configured to detect portions of vehicle 100. Sensor 306 is configured to detect information relating to vehicle 100. For example, in some embodiments, sensor 306 is a camera configured to generate images of vehicle 100. The images of vehicle 100 may be analyzed to identify components on vehicle 100 and/or identify characteristics of vehicle 100 (e.g., a size, a shape, a make and model, etc.). In some embodiments, sensor 306 is configured to detect when vehicle 100 is within range of cleaning device 302. For example, in some embodiments, sensor 306 is a proximity sensor. In alternative embodiments, system 300 may include other sensors 306 without departing from some aspects of the disclosure.

System 300 includes a support 308 sized to extend at least partly across a width of vehicle 100. Support 308 defines a passage for vehicle 100 to travel under beam 310. For example, support 308 includes a beam 310 extending between and connected to legs 312. In the example, support 308 extends across an entire width of vehicle 100 and legs 312 are positioned on opposite sides of vehicle 100. Legs 312 have a length that is greater than a height of vehicle 100 such that beam 310 is above vehicle 100. In some embodiments, support 308 is fixed in position and vehicle 100 moves relative to support 308. In other embodiments, at least a portion of support 308 is movable. In further embodiments, support 308 is transportable to remote locations. For example, in some embodiments, support 308 has a stowed position and may be coupled to a vehicle for transport. In other embodiments, support 308 has one or more drive mechanisms.

Actuator 304 is mounted to support 308. Actuator 304 is configured to move cleaning device 302 relative to vehicle 100 and at least partly across the width of vehicle 100 on support 308 to reach portions of vehicle 100. For example, cleaning device 302 is configured to reach and clean sensors 202 on vehicle 100. In the example, beam 310 of support 308 extends along a longitudinal axis. Cleaning device 302 is movably attached to beam 310 and actuator 304 is configured to move cleaning device 302 on beam 310 of support 308 in a direction parallel to the longitudinal axis. Also, in some embodiments, actuator 304 is configured to rotate or change an orientation of cleaning device 302 relative to beam 310.

Also, sensor 306 is mounted to support 308. For example, sensor 306 is mounted to beam 310 of support and is configured to detect or generate images of vehicle 100 below beam 310. Sensor 306 may be movable relative to support 308 or fixed in position relative to support 308. In the example, sensor 306 is connected to actuator 304 and is movable with cleaning device 302 relative to support 308. In alternative embodiments, cleaning system 300 includes any sensor 306 that enables cleaning system 300 to operate as described herein. For example, in some embodiments, cleaning system 300 includes two or more of sensors 306.

In the example, cleaning device 302 includes a sprayer 314 that is arranged to spray a fluid from cleaning device 302 toward a target. For example, sprayer 314 is configured to direct a controlled stream of the fluid toward sensors 202. The fluid may be any suitable fluid such as, for example and without limitation a gas (e.g., pressurized air), a liquid (e.g., water), a cleaning agent, or a combination of gas, liquid, and/or a cleaning agent. The fluid may be provided from an internal water source (e.g., a reservoir connected to support 308) and/or an external water source. In the example, a fluid line 318 is connected to cleaning device 302 and to a pump 320. Pump 320 is configured to deliver pressurized fluid to cleaning device 302 through fluid line 318. Fluid line 318 extends along support 308 to cleaning device 302. In some embodiments, fluid line 318 is extendible or contractible to facilitate movement of cleaning device 302.

System 300 includes a controller 316 communicatively coupled to sensor 306 and actuator 304. Controller 316 is configured to receive information from sensor 306 and identify vehicle sensors 202 on vehicle 100. For example, the information from sensor 306 may include images, signals, coordinates, and/or any other suitable information, and the information is interpreted by controller 316.

Controller 316 is configured to operate actuator 304 to selectively position cleaning device 302 relative to vehicle 100 and target vehicle sensors 202 on vehicle 100. For example, controller 316 is configured to operate actuator 304 to adjust an orientation of cleaning device 302 and/or a position of cleaning device 302 relative to vehicle 100. In the example, actuator 304 is configured to move cleaning device 302 longitudinally along support 308 and/or rotate cleaning device 302 around an axis parallel to or perpendicular to longitudinal axis of support 308.

Controller 316 includes a communication system that is configured to communicate with an interface 204 onboard vehicle 100 and receive information from interface 204. For example, the information from the onboard interface may relate to at least one of the position of sensors 202 on vehicle 100 or a pollution level of sensors 202. For example, controller 316 is configured to receive information relating to target locations on vehicle 100 from interface 204. Controller 316 is configured to operate actuator 304 to selectively position cleaning device 302 relative to vehicle 100 and clean the target locations on vehicle 100. In some embodiments, the target locations correspond to the position of sensors 202 on vehicle 100. In further embodiments, controller 316 is configured to determine a pollution level of sensors 202 and operate cleaning device 302 based on the determined pollution level. For example, controller 316 may be configured to adjust a pressure or volume of fluid that is discharged from sprayer 314 based on the pollution level of at least one sensor 202 targeted by sprayer 314. In some embodiments, sensor 306 is configured to detect when vehicle 100 is within range of cleaning device 302 and controller 316 activates system 300 when vehicle 100 is within range.

Figure 5:
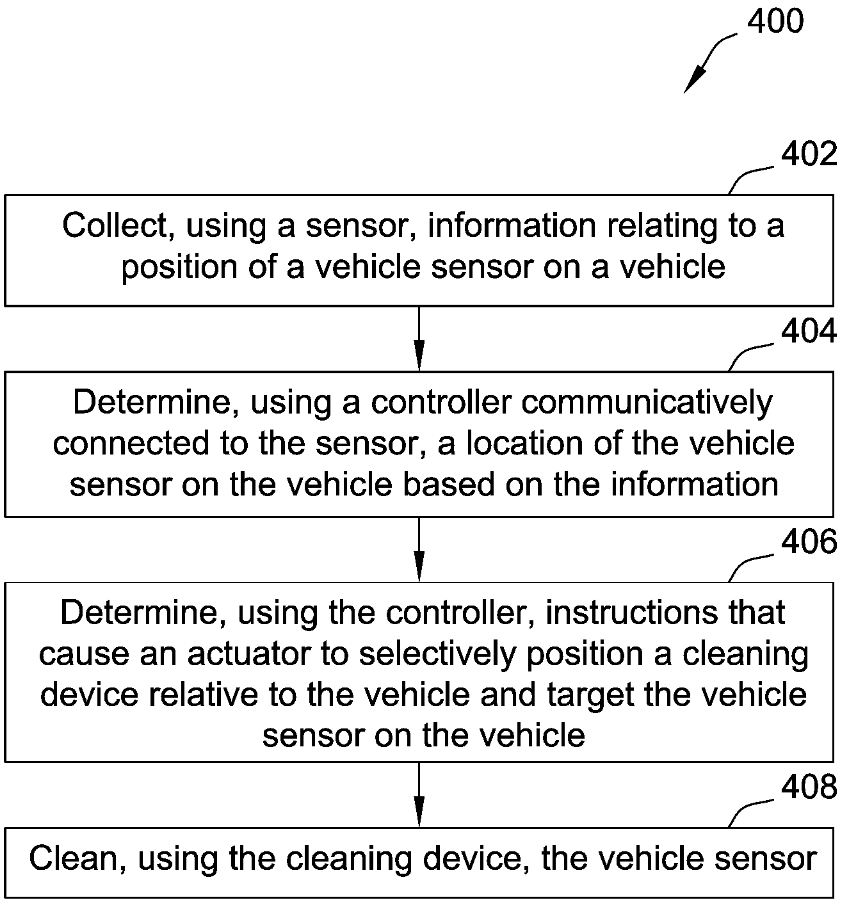
FIG. 5 is a flow chart of a method for cleaning the vehicle sensors on the vehicle shown in FIGS. 1 and 2 using the system shown in FIG. 3.

FIG. 5 is a flow chart of a method 400 for cleaning vehicle sensors 202 (shown in FIG. 1) on vehicle 100 (shown in FIG. 1) using system 300 (shown in FIG. 3). Referring to FIGS. 1-4, method 400 includes collecting 402 information relating to positions of vehicle sensors 202 on vehicle 100. For example, sensor 306 may detect locations of vehicle sensors 202 on vehicle 100. In some embodiments, interface 204 on vehicle 100 sends signals from vehicle 100 to controller 316 and controller 316 receives information from interface 204 relating to at least one of the position of sensors 202 on vehicle 100 or a pollution level of vehicle sensors 202. For example, controller 316 includes a communication system that is configured to communicate with interface 204 onboard vehicle 100.

Method 400 also includes determining 404, using controller 316, locations of vehicle sensors 202 on vehicle 100 based on information received from sensor 306. For example, controller 316 is configured to receive information from sensor 306 and identify vehicle sensors 202 on vehicle 100.

Method 400 also includes determining 406, using controller 316, instructions that cause actuator 304 to selectively position cleaning device 302 relative to vehicle 100 and target vehicle sensors 202 on vehicle 100. For example, controller 316 is configured to relate the position of vehicles sensors 202 to coordinates on a model of vehicle 100 and determine instructions for actuator 304 to move cleaning device 302 along multiple axes to a location in which at least one vehicle sensor 202 or a targeted portion of vehicle 100 is within range of cleaning device 302. Based on the instructions, actuator 304 is configured to move cleaning device 302 relative to vehicle 100 and across the width of vehicle 100 to reach portions of vehicle 100. Cleaning device 302 is connected to support 308 and configured to move across a width of vehicle 100. In some embodiments, controller 316 determines sets of instructions for actuator 304 to move cleaning device 302 and clean a plurality of vehicle sensors 202. For example, actuator 304 moves cleaning device 302 to clean a first one or set of vehicle sensors 202 according to a first set of instructions received from controller 316. After the first of vehicle sensors 202 is cleaned, actuator 304 moves cleaning device 302 according to a second set of instructions received from controller 316. Cleaning device 302 may be moved any number of times required to target sensors 202. In some embodiments, cleaning device 302 is moved while cleaning sensors 202 and/or moved to target different portions of the same sensor 202.

Method 400 includes cleaning 408, using cleaning device 302, vehicle sensors 202. Controller 316 determines operating parameters (e.g., a pressure of fluid, a volume of fluid, a desired contact force on sensors 202, a range of cleaning device 302, a cleaning duration, etc.) for cleaning device 302 to clean vehicles sensors 202. For example, controller 316 is configured to operate cleaning device 302 to spray pressurized fluid at vehicle sensors 202. In some embodiments, controller 316 operates pump 320 to deliver pressurized fluid having a desired fluid pressure through fluid line 318 to cleaning device 302. Controller 316 aims cleaning device 302 such that pressurized fluid contacts vehicle sensors 202 and removes debris or pollution from vehicle sensors 202. In some embodiments, a portion of cleaning device 302 such as a brush contacts vehicle sensors 202.

In some embodiments, method 400 includes determining a pollution level of vehicle sensors 202. For example, in some embodiments, controller 316 determines a pollution level of sensors 202 based on information provided by sensors 202. For example, controller 316 and/or sensors 202 may determine that information such as images provided by sensors 202 are at least partially altered by pollution. Controller 316 is configured to operate cleaning device 302 based on the determined pollution level. For example, controller 316 may regulate pump 320 to provide a higher or lower level of pressure and/or a greater or lesser amount of pressurized fluid based on the determined pollution level.

In the example, cleaning system 300 cleans vehicle 100 when vehicle 100 is parked at a transportation hub for loading or unloading materials from vehicle 100. In other embodiments, cleaning system 300 is located at different locations and/or cleaning system 300 is configured to travel to different locations.

Figure 6:
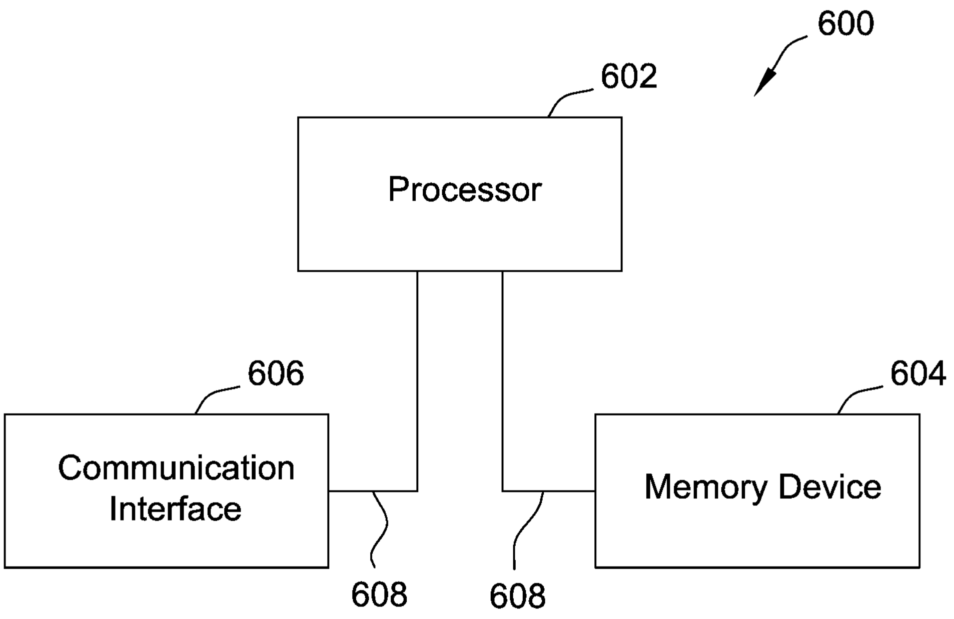
FIG. 6 is a block diagram of an example computing device.

FIG. 6 is a block diagram of an example computing device 600. Computing device 600 includes a processor 602 and a memory device 604. The processor 602 is coupled to the memory device 604 via a system bus 608. The term "processor" refers generally to any programmable system including systems and microcontrollers, reduced instruction set computers (RISC), complex instruction set computers (CISC), application specific integrated circuits (ASIC), programmable logic circuits (PLC), and any other circuit or processor capable of executing the functions described herein. The above examples are example only, and thus are not intended to limit in any way the definition or meaning of the term "processor."

In the example embodiment, the memory device 604 includes one or more devices that enable information, such as executable instructions or other data (e.g., sensor data), to be stored and retrieved. Moreover, the memory device 604 includes one or more computer readable media, such as, without limitation, dynamic random access memory (DRAM), static random access memory (SRAM), a solid state disk, or a hard disk. In the example embodiment, the memory device 604 stores, without limitation, application source code, application object code, configuration data, additional input events, application states, assertion statements, validation results, or any other type of data. The computing device 600, in the example embodiment, may also include a communication interface 606 that is coupled to the processor 602 via system bus 608. Moreover, the communication interface 606 is communicatively coupled to data acquisition devices.

In the example embodiment, processor 602 may be programmed by encoding an operation using one or more executable instructions and providing the executable instructions in the memory device 604. In the example embodiment, processor 602 is programmed to select a plurality of measurements that are received from data acquisition devices.

In operation, a computer executes computer-executable instructions embodied in one or more computer-executable components stored on one or more computer-readable media to implement aspects of the disclosure described or illustrated herein. The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

An example technical effect of the methods, systems, and apparatus described herein includes at least one of: (a) reducing pollution levels of vehicle sensors; (b) increasing the quality of information provided from vehicle sensors during operation of a vehicle; (c) providing autonomous cleaning of vehicle sensors; or (d) facilitating cleaning of vehicle sensors at hubs or remote locations.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or an electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory includes non-transitory computer-readable media, which may include, but is not limited to, media such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary" or "example" embodiment are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A system for cleaning a vehicle sensor, the system comprising:
- a cleaning device movable relative to a vehicle;
- an actuator configured to position the cleaning device relative to the vehicle;
- a sensor configured to collect information relating to a position of a vehicle sensor on the vehicle; and
- a controller communicatively coupled to the sensor and the actuator, wherein the controller is configured to receive information from the sensor and identify the vehicle sensor on the vehicle, wherein the controller is configured to operate the actuator to selectively position the cleaning device relative to the vehicle and target the vehicle sensor on the vehicle,
- wherein the system further comprises a proximity sensor that is configured to detect when the vehicle is within range of the cleaning device.

2. The system of claim 1, wherein the controller is configured to determine a pollution level of the vehicle sensor and operate the cleaning device based on the determined pollution level.

3. The system of claim 1, further comprising a support sized to extend at least partly across a width of the vehicle, wherein the sensor and the actuator are mounted to the support, and wherein the actuator is configured to move the cleaning device relative to the vehicle and at least partly across the width of the vehicle to reach portions of the vehicle.

4. The system of claim 1, further comprising a fluid line connected to the cleaning device and a pump connected to the fluid line, wherein the cleaning device comprises a sprayer configured to spray pressurized fluid delivered to the cleaning device through the fluid line.

5. The system of claim 1, wherein the controller includes a communication system that is configured to communicate with an onboard interface of the vehicle and receive information relating to at least one of the positions of the vehicle sensor on the vehicle from the onboard interface or a pollution level of the vehicle sensor.

6. The system of claim 1, wherein the system is located at a transportation hub, and wherein the cleaning device is arranged to clean the vehicle sensor when the vehicle is parked at the transportation hub for loading or unloading.

7. A system for cleaning target locations on a vehicle, the system comprising:

an onboard interface configured to be incorporated into a vehicle;

a cleaning device movable relative to the vehicle and configured to clean portions of the vehicle;

an actuator configured to position the cleaning device relative to the vehicle; and a controller including a communication system that is configured to communicate with the onboard interface and receive information relating to target locations on the vehicle from the onboard interface, wherein the controller is configured to operate the actuator to selectively position the cleaning device relative to the vehicle and clean the target locations on the vehicle, wherein the system further comprises a sensor configured to collect information relating to a position of a vehicle sensor on the vehicle, the controller communicatively coupled to the sensor and the actuator, wherein the controller is configured to receive information from the sensor and identify the vehicle sensor on the vehicle, at least one of the target locations being the vehicle sensor, wherein the system further comprises a proximity sensor that is configured to detect when the vehicle is within range of the cleaning device.

8. The system of claim 7, further comprising a support sized to extend at least partly across a width of the vehicle, wherein the actuator is mounted to the support, and wherein the actuator is configured to move the cleaning device relative to the vehicle and at least partly across the width of the vehicle to reach the target locations on the vehicle.

9. The system of claim 7, further comprising a fluid line connected to the cleaning device and a pump connected to the fluid line, wherein the cleaning device comprises a sprayer configured to spray pressurized fluid delivered to the cleaning device through the fluid line.

10. The system of claim 7, wherein, based on the information from the sensor, the controller is configured to:

identify the vehicle sensor within the target locations;

determine a pollution level of the vehicle sensor; and operate the cleaning device based on the determined pollution level.

11. A method for cleaning a vehicle sensor, the method comprising:

providing a system of cleaning the vehicle sensor, the system including:

a cleaning device movable relative to a vehicle;

an actuator configured to position the cleaning device relative to the vehicle;

a sensor configured to collect information relating to a position of a vehicle sensor on the vehicle; and a controller communicatively coupled to the sensor and the actuator, the controller configured to receive information from the sensor and identify the vehicle sensor on the vehicle, wherein the controller is configured to operate the actuator to selectively position the cleaning device relative to the vehicle and target the vehicle sensor on the vehicle;

collecting, using the sensor, information relating to a position of the vehicle sensor on the vehicle;

determining, using the controller communicatively coupled to the sensor, a location of the vehicle sensor on the vehicle based on information received from the sensor;

determining, using the controller, instructions that cause the actuator to selectively position the cleaning device on a support, relative to the vehicle and target the vehicle sensor on the vehicle; and cleaning, using the cleaning device, the vehicle sensor, wherein the method further comprises detecting, using a proximity sensor, when the vehicle is within range of the cleaning device.

12. The method of claim 11, further comprising determining a pollution level of the vehicle sensor, wherein the controller is configured to operate the cleaning device based on the determined pollution level.

13. The method of claim 11, further comprising moving the cleaning device relative to the vehicle and across a width of the vehicle, wherein the cleaning device is connected to a support sized to extend across the width of the vehicle.

14. The method of claim 11, wherein cleaning the vehicle sensor comprises spraying pressurized fluid at the vehicle sensor, wherein a fluid line is connected to the cleaning device and a pump is connected to the fluid line, wherein the cleaning device comprises a sprayer configured to spray the pressurized fluid delivered to the cleaning device through the fluid line.

15. The method of claim 11, further comprising receiving signals sent from an onboard interface of the vehicle to the controller, wherein the controller includes a communication system that is configured to communicate with the onboard interface and receive information relating to at least one of the position of the vehicle sensor on the vehicle from the onboard interface or a pollution level of the vehicle sensor.

16. The method of claim 11, wherein cleaning the vehicle sensor comprises cleaning the vehicle sensor when the vehicle is parked at a transportation hub for loading or unloading.

* * * * *